(12) United States Patent
Schenk

(10) Patent No.: US 9,432,080 B2
(45) Date of Patent: Aug. 30, 2016

(54) PROBING AND ESTIMATION OF CROSS-COUPLING

(75) Inventor: Heinrich Schenk, Munich (DE)

(73) Assignee: Lantiq Deutschland GmbH, Neubiberg (DE)

( * ) Notice: Subject to any disclaimer, the term of this patent is extended or adjusted under 35 U.S.C. 154(b) by 839 days.

(21) Appl. No.: 12/333,333

(22) Filed: Dec. 12, 2008

(65) Prior Publication Data

US 2009/0304060 A1    Dec. 10, 2009

Related U.S. Application Data

(60) Provisional application No. 61/020,408, filed on Jan. 11, 2008.

(51) Int. Cl.
| | |
|---|---|
| H04B 3/46 | (2015.01) |
| H04B 3/32 | (2006.01) |
| H04M 3/34 | (2006.01) |
| H04M 11/06 | (2006.01) |

(52) U.S. Cl.
CPC ............... *H04B 3/32* (2013.01); *H04M 3/34* (2013.01); *H04M 11/062* (2013.01)

(58) Field of Classification Search
CPC ........ H04B 3/32; H04M 11/062; H04M 3/34
USPC ........ 375/224, 229, 260, 267, 230; 370/241; 455/67.11; 702/79
See application file for complete search history.

(56) References Cited

U.S. PATENT DOCUMENTS

| | | | |
|---|---|---|---|
| 7,149,239 B2* | 12/2006 | Hudson | 375/144 |
| 7,411,997 B2* | 8/2008 | Umeno et al. | 375/150 |
| 7,555,051 B2* | 6/2009 | Zhang | 375/261 |
| 7,593,449 B2* | 9/2009 | Shattil | 375/130 |
| 7,606,319 B2* | 10/2009 | Zhang et al. | 375/267 |
| 7,852,955 B2* | 12/2010 | Wang et al. | 375/260 |
| 2004/0146095 A1* | 7/2004 | Umeno et al. | 375/150 |
| 2005/0074055 A1* | 4/2005 | Takatori et al. | 375/219 |
| 2009/0207985 A1* | 8/2009 | Cioffi et al. | 379/93.01 |

OTHER PUBLICATIONS

Sigrud Schelstraete, Ed Eckert G.vdsl: Crosstalk channel estimation with improved convergence, Source1: Ikanos Communications, Study group 15, Temporary Document NC-082 ITU Standardization Sector, Apr. 2007, pp. 7.

Markus Ek, Frank Sjöberg G.vdsl2: Pilot sequence assisted vector channel estimation Source: Upzide Labs, Study group 15—Contribution 177, COM 15-C 177-E ITU Standardization Sector, Oct. 2006, pp. 6.

Very high speed digital subscriber line transceivers 2 (VDSL2), chapter 1, pp. 1-2, chapters 10.2 (encl. Fig. 10-2), p. 63, chapter 10.5.1, p. 84 Series G: Transmission systems and media, digital systems and networks, Digital sections and digital line systems—Access networks, ITU-T Standardization Sector, G.993.2, Feb. 2006, pp. 1, 2, 63 and 84.

* cited by examiner

*Primary Examiner* — Dhaval Patel
(74) *Attorney, Agent, or Firm* — Eschweiler & Associates, LLC

(57) ABSTRACT

For each channel of a plurality of channels of a Vector transmission system, a sequence of cross-coupling test signals representing a sequence of complex numbers may be transmitted or received. And for each channel of the plurality of channels a sequence of the real part of the sequence of complex numbers is different to a sequence of the imaginary part of the sequence of complex numbers.

20 Claims, 2 Drawing Sheets

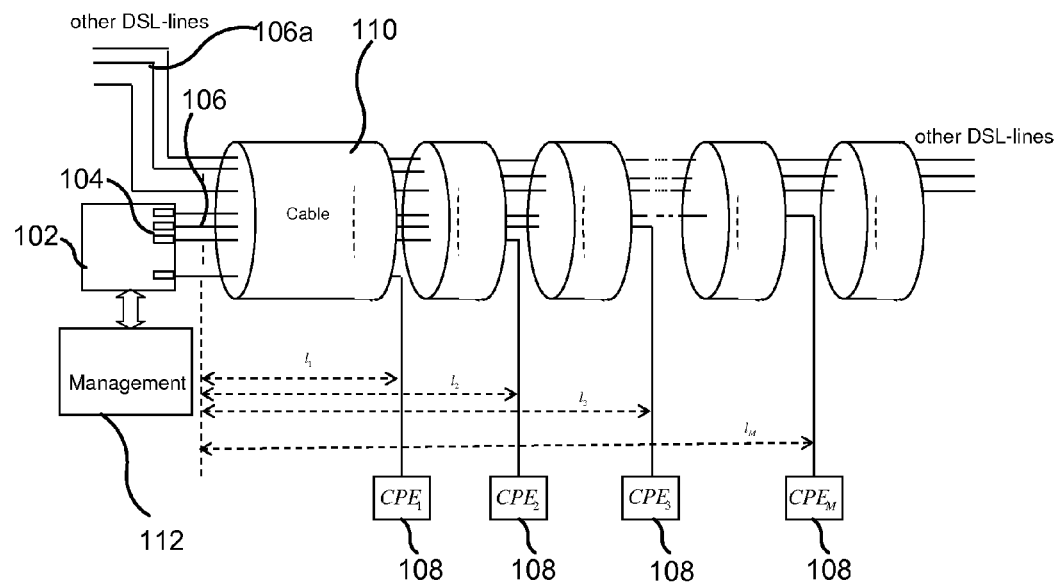
Fig. 1a
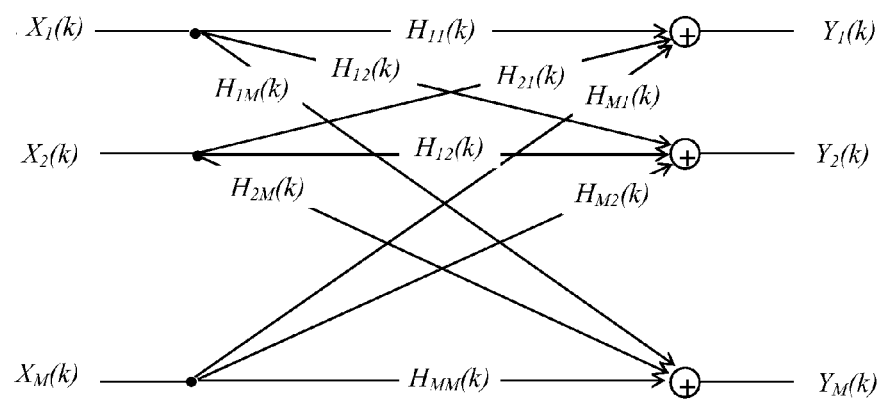
Fig. 1b
Fig. 1

PROBING AND ESTIMATION OF CROSS-COUPLING

REFERENCE TO RELATED APPLICATIONS

This application claims the benefit of the priority date of U.S. provisional application 61/020,408 filed on Jan. 11, 2008, the content of which are herein incorporated by reference.

BACKGROUND

Vector transmission systems are widely used in communication systems and become more and more important for providing high throughput data transmission. Vector transmission systems can be regarded as a MIMO (multiple input multiple output) system where data are transmitted from multiple transmitters over multiple independent channels to multiple receivers.

For example, the DSL (digital subscriber line) transmission according to VDSL (very high bit rate DSL) uses a vector transmission system for transmitting data over a plurality of channels (subscriber lines). According to the VDSL standard, a frequency bandwidth of up to 30 MHz is divided into non-overlapping frequency bands for upstream and downstream communication. Crosscoupling at the near end, which is referred to NEXT (near end cross coupling) data signals is eliminated or reduced in such systems because of the separation of the frequency bands for upstream and downstream. The FEXT crosscoupling (far end cross coupling) which is the crosscoupling of signals at the far end resulting from a coupling of data signals transferred in a same direction on different lines may however reduce a data throughput due to the increased line coupling at higher bandwidth and lower length of the lines.

BRIEF DESCRIPTION OF THE SEVERAL VIEWS OF THE DRAWINGS

FIG. 1a shows a block diagram according to an embodiment of the present invention;

FIG. 1b shows an exemplary cross-coupling in a Vector transmission system according to an embodiment;

DETAILED DESCRIPTION

Figure 2:
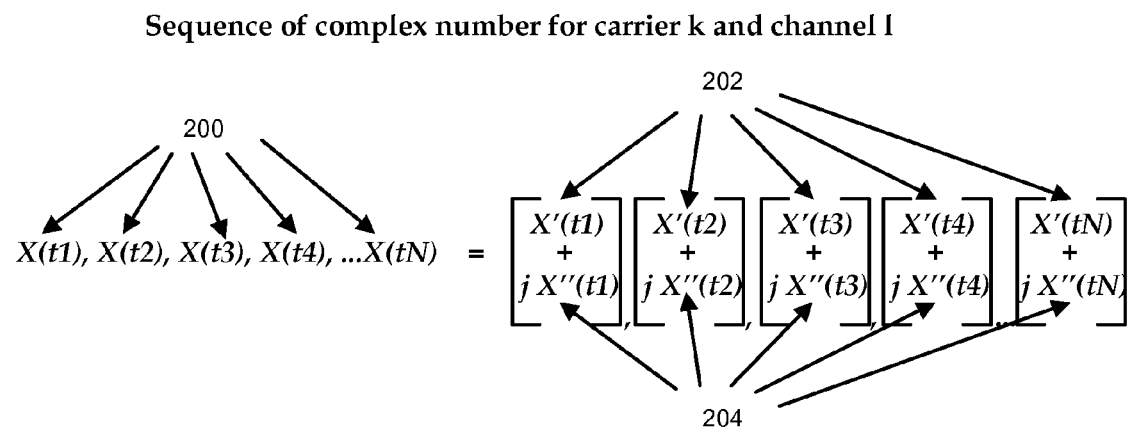
FIG. 2 shows a diagram of a transmit sequence according to an embodiment.

The following detailed description explains exemplary embodiments of the present invention. The description is not to be taken in a limiting sense, but is made only for the purpose of illustrating the general principles of embodiments of the invention while the scope of protection is only determined by the appended claims.

In the various figures, identical or similar entities, modules, devices etc. may have assigned the same reference number.

Referring now to FIG. 1a, an exemplary embodiment of a vector transmission system 100 is shown. In the following detailed description, exemplary embodiments are described with respect to a VDSL vector transmission system. It is to be noted however that the VDSL vector transmission system is only an exemplary embodiment of a vector transmission system and that vector transmission system 100 can be of any other type. Furthermore, it is to be understood that the lines of the VDSL vector transmission system are only one representation of channels of a vector transmission system and that the described VDSL lines may be replaced in other embodiments by other communication channels.

The VDSL vector transmission system comprises a DSLAM (Digital Subscriber Line Access Multiplexer) 102 having a plurality of first transceiver units 104 which are coupled to a plurality of lines 106. Each of the lines of the plurality of lines may for example be implemented as twisted pair wire. DSLAM 102 may be implemented in an Optical Network Unit (ONU) such as a Central Office (CO), a cabinet, an exchange or other types of network termination devices at the operator's end.

Each of the plurality of lines 106 connects the first transceiver units 104 at the operator's end with a respective second transceiver unit 108 at a subscriber end. The first transceiver units 104 are implemented to form with the second transceiver units 108 and lines 106 a vector transmission system. The second transceiver units 108 may for example be integrated in a costumer premise equipment (CPE) such as a home gateway, a router etc. The second transceiver units 108 may be located at different distances with respect to the transceiver units 104 such that the number of lines provided in a cable bundle or cable 110 is decreasing with increasing distance from the first transceiver units 108 as shown in FIG. 1a. It is however to be noted that the second transceiver units 108 may in other embodiments have a same or nearly a same distance from the first transceiver units.

At the operator's side, a management entity 112 may be provided to provide management functions such as spectrum management. As will be described later, the management entity 112 may perform also coordination functionality for transmitting FEXT/line coupling training signals.

Further lines, for example ADSL lines, SDSL lines or ISDN lines, which are designated in FIG. 1a with reference number 106a may be provided in the cable 110. As shown in FIG. 1a, the further lines 106a may terminate at other operator or subscriber termination locations. For example, the VDSL line may be terminated at a cabinet while the ADSL lines may be terminated at a Central Office. According to other embodiments of the present invention, all of the lines provided in the cable 110 may be connected to the first transceiver units. In such embodiments, all of the lines of the cable may be trans-mission lines of the vector transmission system while in the embodiment shown in FIG. 1a, only the lines connected to the first transceiver units 104 may be transmission lines of the vector transmission system.

Distortion of the data transmission on the vector transmission system occurs mainly by two types: distortions which are generated by the vector transmission itself also known as FEXT or self-FEXT and distortions from outside of the vector transmission system also known as alien noise.

While the alien noise typically can not be compensated, the FEXT distortions of the vector transmission system can be compensated by having knowledge of the signals, i.e. of the data transmitted over the lines of the vector transmission system.

In upstream direction all of the data send over the lines 106 terminate at one of the first transceiver units 104 of DSLAM 102. Therefore, at the receiver side, i.e. at the DSLAM, access to all data transmitted over the lines 106 can be provided.

In downstream direction, the data send over the lines 106 are received at the respective second transceiver units 108 which are typically placed at different locations. Typically, no channel between the receiving devices at the different subscriber locations is available. In this case, compensation at the subscriber's end can not be provided as the transceiver unit 108 at one subscriber has no information of the data send to the transceiver unit 108 at another subscriber.

Compensation of the FEXT can be achieved in this case by using a technique known as precompensation. In precompensation, which is also known as preceding or precancellation, the effect of crosstalk experienced by a signal during transmission is computed or estimated prior to transmitting the signal and the signal is modified based on this information for example by subtracting the calculated crosstalk from the transmission signal or adding the negation of the calculated crosstalk. Then, during the transmission, the transmission signal is exposed to the crosstalk, i.e. the crosstalk adds to the transmission signal resulting in the receiving of the original or nearly original, i.e. unmodified or nearly unmodified signal as provided at the transmitting side except of some other noise added during the transmission.

It is to be noted that the term FEXT compensation as used herein may include both the FEXT compensation at the receiver side as described above as well as to the FEXT precompensation at the transmitter side as described above.

In VDSL, data are transmitted using a multicarrier transmission known as DMT (discrete multitone transmission). Each of the frequency bands provided for data transmission is divided into a plurality of non-overlapping subcarriers (tones). For each subcarrier, data bits to be transmitted are represented by a complex number selected of a plurality of predefined complex numbers in a constellation space. It is to be noted that the complex number is sometimes referred to as a constellation vector, a constellation point or a subcarrier symbol. For example, if a 4-QAM (Quadrature Amplitude Modulation) is used for subcarrier k, the complex number is selected from the predefined set of {1+j, 1−j, −1+j, −1−j} where j is the imaginary unit. The complex number of each subcarrier is then transferred to a inverse Fourier transformation unit where a time domain representation is generated by an inverse Fourier transformation also known as DMT symbol.

In the above Vector transmission system, for each of the subcarriers, FEXT compensation can be provided independently of the other subcarriers. A model showing the cross-couplings for one of the plurality of subcarriers in a vector transmission system is shown in FIG. 1b. While FIG. 1b shows the model for one subcarrier, it is to be noted that the model can be applied to each other subcarrier of a DMT system. It is to be noted here that the above model can also be applied to a system wherein on each channel a single carrier modulation is used.

For each subcarrier, the transmission can be described by a MIMO (Multiple In Multiple Out) system wherein the trans-mission system is represented by a transmission matrix H. Diagonal coefficients $H_{ii}$ of the matrix H which are also known as line coupling coefficients define the attenuation and distortion due to the line characteristics of line i. Off-diagonal coefficients $H_{i,j}$ represent the FEXT transmission functions and define the FEXT coupling from line i to line j. For calculating FEXT (pre)compensation the FEXT coefficients for the respective subcarriers have to be determined.

According to the above model, the transmission matrix H(k) for a subcarrier k with M transmission lines is mathematically represented by $$H(k) = \begin{bmatrix} H_{11}(k) & H_{12}(k) & H_{13}(k) & \ldots & H_{1M}(k) \\ H_{21}(k) & H_{22}(k) & H_{23}(k) & \ldots & H_{2M}(k) \\ H_{31}(k) & H_{32}(k) & H_{33}(k) & \ldots & H_{3M}(k) \\ \vdots & \vdots & \vdots & & \vdots \\ H_{M1}(k) & H_{M2}(k) & H_{M3}(k) & \ldots & H_{M}(k) \end{bmatrix}$$

As outlined above, in the matrix H(k), the coefficients $H_{i,j}$ with i≠j correspond to the FEXT coefficients $FEXT_{i,j}$ while the diagonal coefficients $H_{i,i}$ correspond to the line coefficients of channel i determining the attenuation of the transmitted signal on channel i.

In order to provide FEXT compensation, the coefficients of matrix H(k) have to be determined (estimated). This is accomplished according to embodiments of the present invention by transmitting a sequence of cross-coupling test signals from the plurality of transceiver units 104 to the plurality of transceiver units 108 or from the plurality of transceiver units 108 to the plurality of transceiver units 104 as will be described below in more detail. Cross coupling test signals are to be understood as signals which enable to estimate cross-coupling coefficients. As will be described below, they may however serve for other functions such as providing synchronization or pilot signal information.

As described above, in DMT the transmitted cross-coupling signal represents for each subcarrier a complex number which is also referred to as constellation vector or constellation point or symbol. Thus, the transmitted sequence of cross-coupling signals represents for each subcarrier a sequence of complex numbers. According to embodiments, the sequence of cross-coupling test signals for each channel represents a sequence of complex numbers such that the sequence of the real part of the sequence of complex numbers is different to (not linearly dependent on) a sequence of the imaginary part of the sequence of complex numbers.

FIG. 2 shows an exemplary sequence of complex numbers represented by the cross-coupling test signal for a subcarrier k and channel 1. The sequence X(t1), X(t2), X(t3), X(t4), X(tN) represents a sequence 200 of complex numbers transmitted at times (time slots) t1, t2, t3, t4 . . . tN. The sequence of complex numbers 200 is formed by a sequence 202 of the real part X'(t1), X'(t2), X'(t3), X'(t4) . . . X'(tN) and a sequence 204 of the imaginary part X"(t1), X"(t2), X"(t3), X"(t4) . . . X"(tN). Note that the sequence X' and the sequence X" are both a sequence of real numbers.

As described above, the real part sequence X' is different from the imaginary part sequence X", i.e. the sequence X' is not equal to X" or a multiple of X" (X" multiplied by a constant). According to one embodiment, the real part sequence X' and the imaginary part sequence X" are orthogonal to each other. Orthognal sequences means that the dot product X'(t1)·X"(t1)+X'(t2)·X"(t2)+X'(t3)·X"(t3)+X'(t4)·X"(t4) . . . +X'(tN)·X"(tN) of the two sequences (or vectors formed by the sequences X' and X") is zero while the dot product of the sequence X' with itself and the dot product of the sequence X" with itself are non-zero. In other words, for each channel, the real part of the sequence of complex numbers is not correlated to the imaginary part of the sequence of complex numbers. According to one embodiment, the real part sequences and imaginary part sequences are columns or rows of a Hadamard Matrix. A Hadamard matrix is an orthogonal matrix which contains only +1 and −1 such that any column (or row) is orthogonal to each other column (or row). Columns (or rows) of Hadamard matrixes are sometimes referred in the art as Walsh-Hadamard sequences or Walsh sequences.

According to one embodiment, not only the real part sequence and imaginary part sequence of each channel is orthogonal but also each real part sequence of a channel is orthogonal to a real part sequence of each other channel.

Furthermore, according to one embodiment, the real part sequence of each channel is orthogonal to the imaginary part sequence of each other channel.

Thus, according to one embodiment, each real part sequence of a channel is orthogonal to the real part sequence and the imaginary part sequence of each other channel and each imaginary part sequence of a channel is orthogonal to the real part sequence and imaginary part sequence of each other channel. Or in other words, according to this embodiment, each sequence (real or imaginary part) is orthogonal to each other sequence (real or imaginary part) independent whether the other sequence is the other sequence of the same channel or the other sequence of a different channel. It is to be noted that in this case the Hadamard matrix has to be at least the size of twice the number of channels since for each channel two sequences (rows or columns of the Hadamard matrix) are needed for the real part and imaginary part which have not been selected for other sequences. It is further to be noted that any assignment of the real part and imaginary part sequences to rows (or columns) of the Hadamard matrix can be used as long as one row is not assigned to more than one sequences. For example the first row of a Hadamard matrix can be assigned in one embodiment to the real part sequence of channel 1, the second row of the Hadamarad matrix can be assigned to the imaginary part sequence of channel 1, the third row of the Hadamard matrix can be assigned to the real part sequence of channel 2 etc.

According to one embodiment, the real part sequence and the imaginary part sequences of a channel are pseudo-orthogonal. Pseudo-orthogonal sequences are sequences wherein the dot product does not yield exactly zero but a small remainder in the order of one element of the sequence. One example of pseudo-orthogonal sequences are two m-sequence which are shifted against each other. A m-sequence is a pseudonoise sequence known in the art with specific autocorrelation properties.

M-Sequences can be generated by using a feedback shift register. According to one embodiment, only one m-sequence generated by a feedback shift register is used to generate the two pseudo-orthogonal sequences by shifting the m-sequence correspondingly.

According to one embodiment, not only the real part sequence and imaginary part sequence of each channel is pseudo-orthogonal but also each real part sequence of a channel is orthogonal to a real part sequence of each other channel.

Furthermore, according to one embodiment, the real part sequence of each channel is pseudo-orthogonal to the imaginary part sequence of each other channel.

Thus, according to one embodiment, each real part sequence of a channel is pseudo-orthogonal to the real part sequence and the imaginary part sequence of each other channel and each imaginary part sequence of a channel is pseudo-orthogonal to the real part sequence and imaginary part sequence of each other channel. This can be achieved by shifting the m-sequence respectively to each other.

As outlined above, the probing of the cross-coupling for a respective subcarrier is independent to the probing for other subcarriers. Therefore, the selection of sequences for one subcarrier is independent of the selection of sequences for any other subcarrier. For example, according to embodiments, the same sequences can be used for each subcarrier or different sequences can be used for the respective subcarriers. Furthermore, it is to be noted that the above cross-coupling probing signals for one subcarrier may be used for a single-carrier system wherein only one carrier is used.

According to embodiments, the transmission of the cross-coupling test signals on the plurality of channels is synchronized such that test signals are transmitted simultaneously on the channels of the Vector transmission system, i.e. during the same time slots. According to one embodiment, the sequence of cross-coupling test signals are a sequence of pilot signals. According to one embodiment, the pilot signal represents a SYNC symbol provided in an assemble of data frames also known as a superframe. For example the pilot signal may represent a SYNC symbol provided every 257th transmitted DMT symbol allowing to transfer 256 data symbols representing user data in between. S Furthermore, according to one embodiment, the above described sequences may represent weighted orthogonal sequences sequences. This means that the orthogonal sequences, for example rows or columns of a Hadamard matrix, are multiplied by a complex number. The complex number may be selected from predetermined complex numbers such as complex numbers representing for each subcarrier a vector in the constellation space (constellation point). Thereby on each subcarrier a specific information bit sequence can be transmitted. For example the complex number may be selected from the 4 complex number (constellation vectors) in a 4-QAM modulation representing the bit sequences 00, 01, 10 and 11. The multiplication with a complex number may be provided for the real and imaginary part sequence of each of the plurality of subcarriers and the specific information transmitted on the plurality of subcarriers may be selected to indicate a unique bit sequence to the receiver. For example, as described above, the unique bit sequence transmitted on all subcarriers may represent a SYNC-word to provide a synchronization between the transmitter and receiver. According to one embodiment, the above described transmission of unique bit information such as a SYNC-word generated by weighting the orthogonal or pseudo-orthogonal sequences can be provided simultaneously on all channels allowing at the same time the transmission of SYNC-words and synchronization of all channels.

As described above, the respective cross-coupling signals representing a SYNC-word may according to embodiments be transmitted every nth symbol. For example, according to one embodiment, the cross-coupling signals representing a SYNC-word may be transmitted in a superframe having in addition to the cross-coupling test signal representing the SYNC-word 256 data signals representing used data words. It is to be noted that by using the orthogonal Walsh-Hadamard sequences, the above described weighting can be regarded as transmitting the regular SYNC words which are multiplied according to the sequence with either +1 or −1.

In order to estimate or determine the transmission matrix H, a receive error is determined at the receiver side. A receiver is therefore operable to receive a sequence of signals and to determine a receive error by comparing the sequence of signals with cross-coupling test signals representing the sequence of the transmitted complex numbers wherein the sequence of a real part of the sequence of complex numbers being orthogonal to the sequence of an imaginary part of the sequence of complex symbols.

In more detail, each transceiver unit measures each of the cross-coupling test signals received and demodulates the signal by equalizing the signal and Fourier transforming the equalized signal. Equalizing the signal provides compensation for the signal attenuation on the respective channel represented by the diagonal coefficients of matrix H. Finally, a the received complex number (in the constellation space) is obtained. Due to the cross-coupling effects and the alien noise experienced during the transmission, the received complex number and the original send complex number in the constellation space deviate from each other.

The coefficients of Matrix H(k) are then determined from the measured receive signal by estimating the receive error (sometimes referred to as error sample or slicer error) of the receive signal Y.

If the cross-coupling test signals transmitted at a time t1 on all of a plurality of L channels are represented by a sender vector $$\vec{x}(t1) = \begin{bmatrix} x_1(t1) \\ x_2(t1) \\ ... \\ x_L(t1) \end{bmatrix}$$

then the sequence of the cross-coupling test signals transmitted at time slots t1, t2, . . . tN on all of the plurality of L channels can be obtained by a matrix $$X = \begin{bmatrix} x_1(t1) & x_1(t2) & ... & x_1(tN) \\ x_2(t1) & x_2(t2) & ... & x_2(tN) \\ ... & ... & ... & ... \\ x_L(t1) & x_L(t2) & ... & x_L(tN) \end{bmatrix}.$$

Similar, the sequence received at the receiver on all of the L channels at the time slots t1, t2, . . . tN can be written as a matrix $$Y = \begin{bmatrix} y_1(t1) & y_1(t2) & ... & y_1(tN) \\ y_2(t1) & y_2(t2) & ... & y_2(tN) \\ ... & ... & ... & ... \\ y_L(t1) & y_L(t2) & ... & y_L(tN) \end{bmatrix}.$$

The receive matrix Y can be obtained by multiplying the sender Matrix X with the transmission matrix H and adding a matrix $\Delta$ which takes into account the alien noise added during the transmission: $Y=HX+\Delta$.

The matrix representing the equalized receive error can then be expressed by $Z=H_d^{-1}Y-X=FX+H_d^{-1}\Delta$ where $H_d^{-1}$ represents a diagonal matrix having as coefficients the diagonal coefficients $H_{ii}$ of matrix H and F represents the equalized cross-coupling matrix without the transmit coefficients $H_{ii}$, i.e. all diagonals are zero.

Assuming a uniform distribution of the alien noise and using a least square estimate, the estimate $\hat{F}$ of the cross-coupling matrix can be expressed by $\hat{F}=ZX^{*T}(XX^{*T})^{-1}$, where $X^{*T}$ represent the transposed and complex conjugated matrix of X and $(XX^{*T})^{-1}$ is the inverse of matrix $(XXT^{*T})$.

By using orthogonal sequences as described above, the estimated cross-coupling matrix can be calculated in a simple way by $\hat{F}=ZX^{*T}$ since $(XX^{*T})^{-1}$ is equal to the unity matrix for an orthogonal matrix X.

It is to be noted that the estimate $\hat{F}$ of the cross-coupling matrix can be calculated according to one embodiment by using both real and imaginary part of the receive error Z. However, the estimate $\hat{F}$ of the cross-coupling matrix may in some embodiments be calculated by using only the real part of the receive error matrix resulting in $\hat{F}=2\text{real}(Z)X^{*T}$ or by using only the imaginary part of the receiver error matrix resulting in $\hat{F}=2j\,\text{imag}(Z)\,X^{*T}$.

As described earlier, embodiments provide in addition to the using of the

In the above description, embodiments have been shown and described herein enabling those skilled in the art in sufficient detail to practice the teachings disclosed herein. Other embodiments may be utilized and derived there from, such that structural and logical substitutions and changes may be made without departing from the scope of this disclosure.

This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

It is further to be noted that specific terms used in the description and claims may be interpreted in a very broad sense. For example, the terms "circuit" or "circuitry" used herein are to be interpreted in a sense not only including hardware but also software, firmware or any combinations thereof. The term "data" may be interpreted to include any form of representation such as an analog signal representation, a digital signal representation, a modulation onto carrier signals etc. Furthermore the terms "coupled" or "connected" may be interpreted in a broad sense not only covering direct but also indirect coupling.

Furthermore, while the embodiments related to a DSL Vector transmission system using DMT modulation have been described it is to be noted that in other embodiments the Vector transmission system may use other multicarrier modulation or use a single carrier modulation.

The accompanying drawings that form a part hereof show by way of illustration, and not of limitation, specific embodiments in which the subject matter may be practiced.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
   for each channel of a plurality of channels of a VDSL (Very High Bit Rate Digital Subscriber Line) Vector transmission system transmitting a predetermined sequence of cross-coupling test signals representing a sequence of complex numbers to a receiver, each complex number having a real part and an imaginary part, wherein for each channel of the plurality of channels a sequence of the real parts of the complex numbers of the sequence of complex numbers is a different sequence than a sequence of the imaginary parts of the complex numbers of the sequence of complex numbers;
   receiving the sequence of cross-coupling test signals;
   determining a receive error based on the received sequence of cross-coupling test signals and the transmitted sequence of cross-coupling test signals, the determining a receive error comprises determining a complex valued receive error or determining a real part of the complex valued receive error or determining an imaginary part of the complex valued receive error, and
   estimating at least one of coefficients of a cross-coupling precancellation matrix or coefficients of a cross-coupling cancellation matrix based on the receive error.

2. The method according to claim 1, wherein for each channel the sequence of the real parts is orthogonal or pseudo-orthogonal to the sequence of the imaginary parts of the same channel.

3. The method according to claim 2, wherein for each channel the sequence of the real part is orthogonal or pseudo-orthogonal to the sequence of the real part of each other channel.

4. The method according to claim 1, wherein for each channel the sequence of the real part is orthogonal or pseudo-orthogonal to the sequence of the imaginary part of each other channel.

5. The method according to claim 2, wherein the sequence of the real part and the sequence of the imaginary part are one of the following sequences:
   a Walsh-Hadamard Sequence;
   a weighted Walsh-Hadamard Sequence representing a Walsh-Hadamard Sequence multiplied with a complex factor or non-complex factor a m-sequence, or
   a weighted m-sequence representing a m-sequence multiplied with a complex factor or non-complex factor.

6. The method according to claim 1, wherein subsequent cross-coupling test signals of the sequence of cross-coupling test signals are transmitted every nth transmitted signal, n being an integer number greater than 1.

7. The method according to claim 1, wherein each of the cross-coupling test signals represents a SYNC symbol of a superframe.

8. The method according to claim 1, wherein each cross-coupling test signal of the sequence of cross-coupling test signal is modulated on a plurality of sub carriers, and wherein for each of the plurality of sub carriers and for each channel a sequence of complex numbers the sequence of the real parts is orthogonal or pseudo-orthogonal to the sequence of the imaginary parts.

9. The method according to claim 1, wherein the transmission of the sequence of cross-coupling test signals for each communication channel is synchronized such that cross-coupling test signals for each communication channel are transmitted synchronously in a same time slot.

10. The method according to claim 1, further comprising: estimating coefficients of a cross-coupling matrix based on the receive error.

11. The method according to claim 1, wherein each complex number of the sequence of complex number represents a constellation vector.

12. A device comprising:
   a transmitter, wherein the transmitter is operable to transmit a predetermined sequence of cross-coupling test signals representing a sequence of complex numbers over a plurality of VDSL channels, each complex number having a real part and an imaginary part, wherein a sequence of the real parts of the complex numbers of the sequence of complex numbers is orthogonal or pseudo-orthogonal to a sequence of the imaginary part for each channel of the plurality of channels,
   the device being operable to estimate at least one of coefficients of a cross-coupling precancellation matrix or coefficients of a cross-coupling cancellation matrix based on a receive error obtained in response to the sequence of cross-coupling test signals.

13. The device according to claim 12, wherein the sequence of the real part and the sequence of the imaginary part are one of the following sequences:
   a Walsh-Hadamard Sequence;
   a weighted Walsh-Hadamard Sequence a m-sequence, or
   a weighted m-sequence.

14. The device according to claim 12, wherein the transmitter is operable to transmit subsequent cross-coupling test signals of the sequence of cross-coupling test signals every nth transmitted signal, n being an integer number greater than 1.

15. The device according to claim 12, wherein each of the cross-coupling test signals represents a SYNC symbol of a superframe.

16. The device according to claim 12, wherein the sequence of cross-coupling test signals is a sequence of multicarrier signals, the sequence of multicarrier signals representing for each subcarrier of a plurality of subcarriers a sequence of complex numbers and wherein for each of the plurality of subcarriers the sequence of the real part of the sequence of complex numbers is orthogonal or pseudo-orthogonal to the sequence of the imaginary part.

17. A device comprising
   a receiver circuit operable to receive a predetermined sequence of received signals via VDSL and to determine a receive error by comparing the sequence of received signals with cross-coupling test signals representing a sequence of complex numbers, each complex number having a real part and an imaginary part, the sequence of the real parts of the complex numbers of the sequence of complex numbers being orthogonal or pseudo-orthogonal to the sequence of the imaginary parts of the complex numbers of the sequence of complex numbers, the sequence of received signals received on one channel of a plurality of channels,
   the receiver circuit being operable to estimate at least one of coefficients of a cross-coupling precancellation matrix or coefficients of a cross-coupling cancellation matrix based on the receive error.

18. A VDSL system comprising:
   a plurality of transmitters, each of the plurality of transmitters operable to transmit on one channel of a plurality of VDSL, channels a predetermined sequence of cross-coupling test signals representing a sequence of complex numbers, each complex number having a real part and an imaginary part, wherein for each channel of the plurality of channels a sequence of the real parts of the complex numbers of the sequence of complex numbers is orthogonal or pseudo-orthogonal to a sequence of the imaginary parts of the complex numbers; and a plurality of receivers, each of the plurality of receivers operable to receive on one of the plurality of channels the transmitted sequence of cross-coupling test signals and to determine a receive error by comparing the sequence of received cross coupling test signals with predetermined cross-coupling test signals, wherein the system is operable to determine at least one of a cross-coupling precancellation matrix or a cross-coupling cancellation matrix based on the receive error.

19. The system according to claim 18, wherein the sequence of the real part and the sequence of the imaginary part are one of the following sequences:

a Walsh-Hadamard Sequence;

a weighted Walsh-Hadamard Sequence representing a Walsh-Hadamard Sequence multiplied with a complex factor or a non-complex factor a m-sequence, or a weighted m-sequence representing a m-sequence multiplied with a complex factor or a non-complex factor.

20. The system according to claim 18, wherein each of the cross-coupling test signals represents a SYNC symbol of a superframe.

* * * * *